United States Patent [19]

Peters et al.

[11] Patent Number: 4,727,497

[45] Date of Patent: Feb. 23, 1988

[54] DECODER

[75] Inventors: Henrikus J. G. Peters, AA Lierop; Jongen Alphons B. P., BR Vlodrop; Franciscus H. J. Tunnissen, BK Venlo, all of Netherlands

[73] Assignee: OCE-Nederland B.V., Venlo, Netherlands

[21] Appl. No.: 781,922

[22] Filed: Sep. 30, 1985

[30] Foreign Application Priority Data

Oct. 2, 1984 [NL] Netherlands ............ 8402998

[51] Int. Cl.$^4$ ............................... G06F 3/12
[52] U.S. Cl. .................... 364/518; 340/750; 340/800; 340/804
[58] Field of Search ............ 364/518, 521; 380/50; 340/799, 800, 750; 358/11, 15

[56] References Cited

U.S. PATENT DOCUMENTS

| | | | |
|---|---|---|---|
| 4,079,458 | 3/1978 | Rider et al. ................. | 364/900 |
| 4,158,837 | 6/1979 | Zahorsky ................... | 340/804 |
| 4,300,206 | 11/1981 | Belleson et al. ............ | 364/900 |
| 4,546,433 | 10/1985 | Tucker ..................... | 364/200 |
| 4,583,118 | 4/1986 | Mallinson et al. .......... | 364/521 X |

Primary Examiner—Gary V. Harkcom
Assistant Examiner—H. R. Herndon
Attorney, Agent, or Firm—Reed Smith Shaw & McClay

[57] ABSTRACT

The present invention relates to a decoder for converting compiled page information supplied in code into information which can be directed to a raster output scanner in the form of a serial pixel bit flow.

3 Claims, 8 Drawing Figures

DECODER

FIELD OF THE INVENTION

The present invention relates to a decoder for converting compiled page information supplied in code into information which can be directed to a raster output scanner in the form of a serial pixel bit flow.

BACKGROUND OF THE INVENTION

The decoder of the present invention is especially well suited for use in fast applications. Various systems have been devised to control raster output in printing systems. For example, in U.S. Pat. No. 4,300,206 an image generator is described for positioning text and image data of any size or orientation on a page.

In U.S. Pat. No. 4,079,458 a high resolution character generator is described for producing rows of characters to be scanned on a display medium wherein the input data defining characters to be printed in ordered rows of text is sorted to provide specifications for characters on each successive scan line. The data relating to the characters to be printed on lines are sorted in such a way that all of the characters which start on the same scanning line are grouped together. The data of the characters which start on successive scanning lines are stored in an input memory, and the data relating to partially processed characters are stored in an active memory. Pixel pattern data for a number of characters are stored at separately accessible address locations in a front memory and are retrieved as a function of the data from the input memory and the activity memory during the successive scanning lines. The retrieved data are placed in an output memory and are then directed in the form of a serial pixel data flow to an output device such as an xerographic printer. To increase the processing speed, two output memories are used such that while data is being read out of the first output memory, the second output memory can be loaded. Notwithstanding the use of two output memories, processing speed is not sufficiently fast.

Various other page printing schemes have been proposed for converting high level encoded page layout information into a printed page, see International Application No. 83/03487 (U.S. Ser. No. 363,761 now abandoned and U.K Application No. GB 2 119 982 A. Also of interest is U.S. Pat. No. 4,143,950 which discloses apparatus for assembling binary data bits in parallel by groups in variable, selected locations in a shift for subsequent serial readout.

Because many of the prior art systems utilize word displacement in conformity with a relevant address as well as the nature of output memory devices, the decoding schemes are not conductive to high speed decoding. Accordingly, it is an object of the present invention to overcome the limitations of prior art decoders, and, in particular, to overcome the limitations in speed in decoding compiled page information for use by a raster output scanner.

SUMMARY OF THE INVENTION

Generally, the present invention comprises a first memory for the storage of all items occuring on the compiled page together with the m-bits information relating to the position of those items on the page, the sorted table of items (STI). A second memory is used for the storage of the bit patterns of all items occurring in the first memory, the pixel pattern data table (PPD).

A third memory is used for the storage of the address information relating to the bit patterns in the second memory and for the storage of format information for the items, the table of pointers to pixel pattern data (TPPD). The decoder also includes means for converting data taken from the sorted table of items, the pixel pattern data table, and the table of pointers to pixel data into n-bits words for each scanning line, and at least one n-bits wide pixel column memory.

The decoder of the present invention utilizes a rotation logic circuit to shift n-bits words in a register as a function of the M least significant bits of the m-bits information relating to the position of the items on the page as stored in the first memory such that $2^M = n$. Further, a circuit is included to store the information not shifted out of the register of the rotation logic in the pixel column memory at an address location which is double that of (m−M) most significant bits of position information and stores the information shifted out of the register at the next higher address location.

Additionally, the decoder includes a first parallel-in-serial-out shift register which can be connected via a buffer to the odd address locations of the pixel column memory and a second parallel-in-serial-out shift register which can be connected in relation the first shift register to the next higher address locations of the pixel column memory, and a combination circuit connected to the serial-out connections of the first and second shift registers. A counter connected to the address lines of pixel column is used for generating successive addresses when the pixel column memory is read.

In the present invention, parallel data processing is applied so that conversion of coded information into the required image information can proceed very rapidly. The rapid conversion can be achieved in the present invention with little memory capacity. Other advantages of the invention will become apparent from a perusal of the following detailed description of a presently preferred embodiment taken in connection with the accompanying drawings.

PRESENTLY PREFERRED EMBODIMENT

Figure 1:
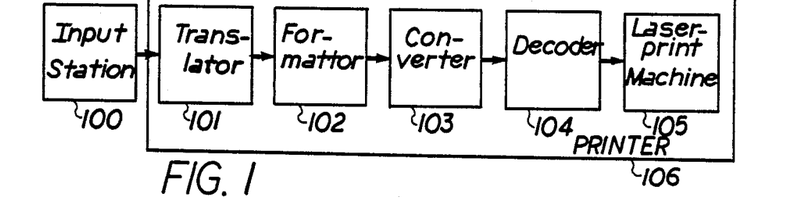
FIG. 1 is a schematic representation of the location of the decoder in a image processing station.

With reference to FIG. 1, at input station 100 such as a word processor a page is typed and sent to the printer 106. In printer 106 the incoming page is converted, with the aid of translator 101, into a code suitable for use by the printer, such as the UIL (universal input language). This information, in UIL code, is fed to formattor 102 in which the formatted page is compiled. The compiled page contains each character (or font) with its X and Y positions on the page and its font code. The formatted-page information is then arranged in the converter 103 to make what is known as a "converted page," suitable for use by decoder 104.

Decoder 104 translates the arranged information into a video signal which is used to modulate the laser beam of laser printer 105. With the aid of laser beam 105, an electrophotographic image is written in accordance with known methods, and laser printer 105 prints out this image on a medium, for example, plain paper. The printer which is used with the decoder according to the present invention is designated to process a page in the landscape form as well as in the portrait form. However, to provide a clear description of the printer, it will be assumed that a page of text in the portrait form is supplied from a word processor or like input station. The laser printer reproduces this information rotated through 90 degress. The terms X and Y direction relate to the information originally supplied, in other words, the X direction is the direction parallel to the lines and the Y direction or SCAN direction is the direction at right-angles to the lines.

Through converter 103 decoder 104 receives three different tables, known as the "decoder tables." The first table is called the "sorted table of items" (STI) and contains all items which occur on a page in their sorted X sequence. Here, an item is understood to mean a letter, number or logo. All items which start with a same X value are grouped and the set of such items is referred to as a column. All columns are closed with an "end of column" (EOC) bit. This EOC bit is also present where a column remains empty if there is no single item to start the relevant X value. If printing has to be done at a resolution of, for example, 12 dots/mm, about 2520 columns are needed for one A4 size page. This means that the STI table will consist of 2520 sub-tables of varying lengths. If a number of items start with one specific X value, such a sub-table will be long (for example, 600 locations), while a sub-table for an empty column will consist of one location. Each element of the STI table contains an item number (this is a unique code for each character or logo) and the Y starting value for that item on the page to be printed.

The second of the decoder tables is the "Table of Pointers to Pixel Pattern Data" (TPPD), which is a vector table. The vector is an address in the pixel pattern memory. In this table the relevant information on the height and width of the item is also stored for each item number. The height of an item is indicated in units of 16 pixels, the width in units of 1 pixel. The last of the decoder tables is the "Pixel Pattern Data" table (PPD) which contains the pixel pattern of all items occurring on the page and which can best be described as a sort of loadable character memory.

The items are built up of pixel words of 16 pixels. The collection of all 16-bits pixel words in one item, sorted according to their ascending Y position and with one value for X, is referred to as an item-slice.

Once the decoder has been loaded with the three tables, the decoding process can begin. One column is read out of the STI table each time, and each item occurring in the table is expanded with the aid of the TPPD table and the pixels are supplied to a line buffer. If an item in a preceding scan has still not been completely processed, the remaining information from it is placed in a tally memory. Each element in the tally memory contains the information on the height of the item, the width that remains to be processed, the Y position and the address in the PPD table where the relevant pixel pattern of the item being processed is located.

Each element from the tally memory, therefore, comprises two types of information, namely, information which makes it possible to address the memory in which the PPD table is located, and information relating to the Y position which indicates the starting point from which the relevant pixels for this item should be placed on paper. During each scan (Y cross-section of the page) all elements of the tally memory are processed and, if an item has still not been fully processed, it is put back in the tally memory. If all elements of a scan have been processed, new elements of a following column are processed and, here again, the items which are not fully processed are put back in the tally memory. All pixels of a scan are read into a first line buffer and are read out in response to a command from the laser printer while a second buffer line is being filled with the information for the following scan.

Figure 2:
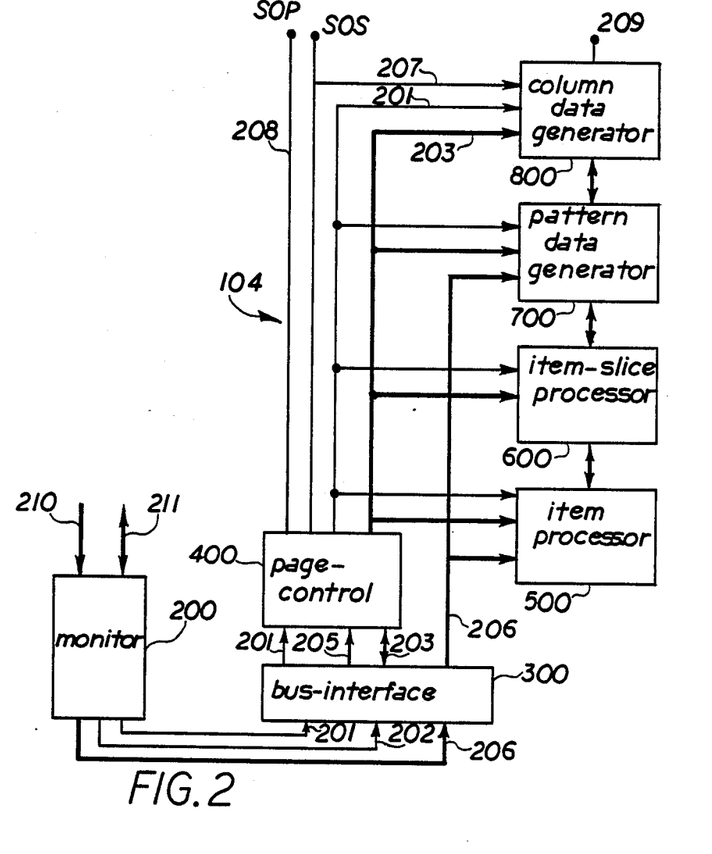
FIG. 2 is a schematic representation of the decoder of the present invention.

FIG. 2 provides a schematic representation of decoder 104. The actual decoder consists of item processor 500, item-slice processor 600, pattern data generator 700, and column data generator 800 modules. For control purposes, monitor 200, page-control 400, and bus-interface 300 have also been added.

The information from a page is passed via bus 210 to monitor 200, while decoder dialogue between an input station and the monitor 200 is transmitted via bus 211. The system-clock line 201 is linked to the other modules via bus-interface 300. Controlling signals, such as the "decode-a-page" signal, are linked to the various modules via bus-interface 300 through bus 203. The information on the contents of a page is supplied to the modules via bus 206 and bus-interface 300.

The function of page-control 400 is page synchronisation; that is, synchronising laser printer 105 and decoder 104 with a "decode-a-page" command. Item processor 500 comprises the memories for the STl and TPPD tables. These are loaded vis bus 206. Item processor 500 also supplies items in response to requests from item-slice processor 600. Item-slice processor 600 receives items from item processor 500 and supplies item-slices in response to requests from the pattern data generator 700. Items which consist of several slices are temporarily stored in a tally memory in item-slice processor 600.

Pattern data generator 700 receives item-slices from item-slice processor 600. Via bus 206 the 16-bit pixel patterns are retrieved across their full height from the PPD memory and are supplied, together with their relevant Y positions, to column data generator 800 upon request. Column data generator 800 receives the pixel patterns and the Y position of an item via pattern data generator 700. For the laser printer a pixel bit flow 209 is generated, which supplies the pixel patterns serially according to their Y sequence. Pixel patterns with an identical Y position (overlay) are combined. A "start-of-page" signal (SOP) is fed from the laser printer by means of line 208 to page-control 400. The "start-of-scan" signal (SOS) is fed through line 207 to page-control 400 and to the column data generator 800.

ITEM PROCESSOR 500

Figure 3:
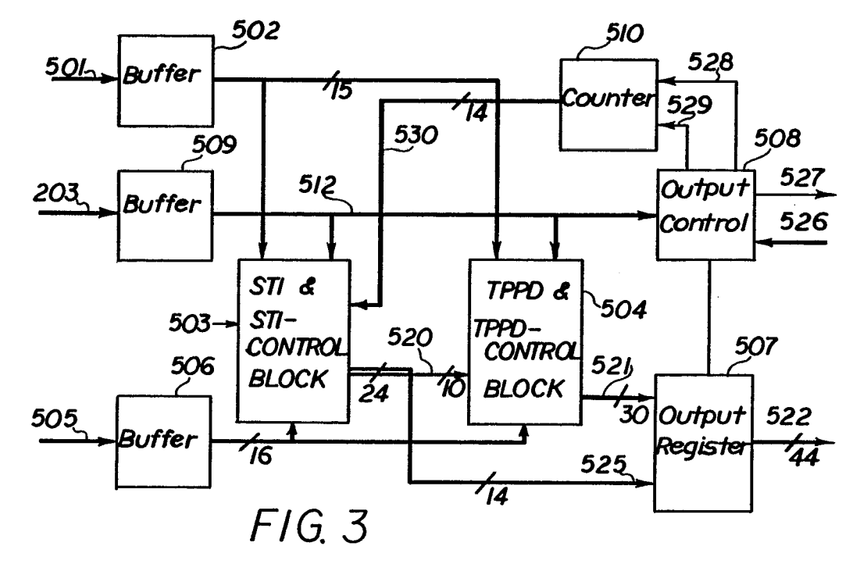
FIG. 3 is a block diagram of the item processor of the decoder.

The operation of the item processor will be explained by reference to FIG. 3. By way of buffer 502 the addresses of the items occurring on a page which are supplied on bus 501 are fed to STI and STI-control block 503 as well as to TPPD and TPPD-control block 504. Via buffer 506 the corresponding data supplied on bus 505 are likewise fed to block 503 and block 504. Buses 501 and 505 form part of bus 206 as indicated in FIG. 2. Via buffer 509 the internal control bus 512 is linked to bus 203.

Blocks 503 and 504 both comprise a memory and a control section. In a period when no "decode" signal is present on bus 512, the memories in blocks 503 and 504 are filled with information about a compiled page. The STI table is read into the memory of block 503 and the TPPD table into the memory of block 504. The STI table is a 24-bits wide table which is subdivided into 12 bits which indicate the item's Y position on the page, 10 bits for the item number, one "end of column" bit (EOC) and one reverse bit. If a "decode" signal is supplied to bus 512, then the information relating to the items occurring on a page will become available item by item from the STI memory via buses 520 and 525. The 10 bits which represent the item number are supplied via bus 520 to the TPPD and TPPD-control block 504. They constitute the address for the TPPD table which is present in the memory of block 504. The remaining 14 bits of the STI table are fed via bus 525 to an output register 507.

The TPPD table which is present in block 504 is 30 bits wide. Of these bits, 18 bits indicate the PPD base address while 8 bits of the remaining 12 bits represent the width of the item and 4 bits represent the height of the item.

During the decode state these data are likewise supplied from the TPPD table via bus 521 to the output register 507. Bus 522, which connects output register 507 with item-slice processor 600 and which is 44 bits wide, thus holds all information relating to one item, namely, the Y position on the page (12 bits), the PPD base address (18 bits), the width (8 bits) and the height (4 bits), the EOC bit and one reserve bit.

The item processor 500 only supplies data to the item-slice processor 600 at the latter's request. For this purpose a datarequest signal 526 is fed to output control 508. The item processor transmits a data-available signal 527 to the item-slice processor if the requested data are present in output register 507.

A counter 510 is linked to the STI and STI-control block 503. The counter readings are used to read out the STI table sequentially, while the counter reading indicates the address in the table. When a decode-a-page signal is sent via item-slice processor 600 to output control 508, the latter generates a counter-reset signal which is supplied to the counter via line 528. The readout of the STI table starts at address 0. At every datarequest signal 526, the counter reading is increased by one via line 529.

ITEM-SLICE PROCESSOR 600

Figure 4:
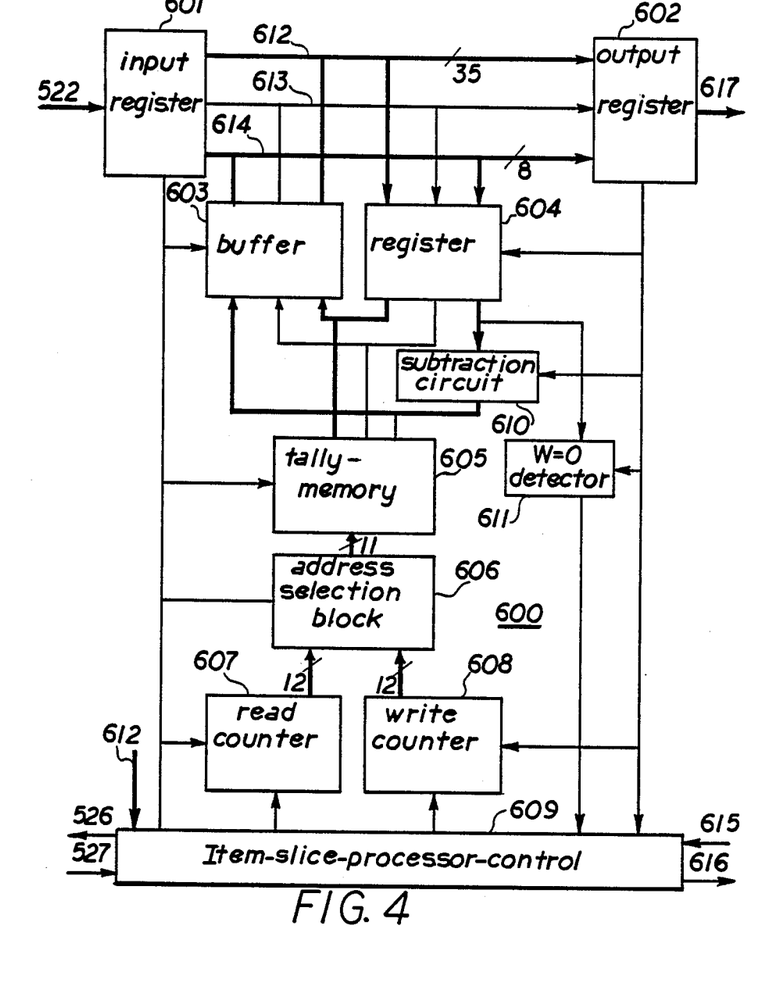
FIG. 4 is a block diagram of the item-slice processor of the decoder.

FIG. 4 is a schematic representation of item-slice processor (ISP). During the dedoding process itemslice-processor control 609 (ISP control) generates a data-request signal 526 for the item processor 500. If this item processor is ready for data transmission, it gives a data-available signal 527 to the ISP control 609. Then one column is retrieved from the item processor 500 through bus 522 and via input register 601 and this column is passed on to the pattern data generator 700 via output register 602 and bus 617. One column contains all items having the same value of X which occur on a page.

The 44 bits wide bus 522 is divided up in the ISP into a 35 bits wide bus 612, which transports the PPD base address, the height of the item and its Y position, a line 613 through which an EOC bit can be transported, and an 8 bits wide bus 614 which transports information relating to the width-1 of an item. IF an item is composed of more than one slice (which will usually be the case), the data of that item are stored via register 604 into tally memory 605. This tally memory is a 2K×48 bit memory. The bit information relating to the width of the item is reduced by one with the aid of subtraction circuit 610 and is also stored in the tally memory 605. The portion of an item that is left over after one or more slices have already veen removed is referred to as the item remainder.

If a first column has been sent in this way via bus 617 to pattern data generator 700, which is indicated by an EOC bit, then a start can be made on the second column. For this purpose the item remainder of the first item is supplied from tally memory 605 vai buffer 603 and output register 602 through bus 617 to pattern data generator 700. The W=0 detector 611 serves to ascertain whether the width-1 information relating to the item or item remainder being processed has decreased to zero. If this is not the case, the bit information relating to the width of the item is again reduced by one with the aid of subtraction circuit 610. This new item remainder is stored in tally memory 605 again. If the width-1 information has decreased to zero, then the item has been fully procesed and is therefore no longer fed via register 604 to the tally memory.

After all items stored during the previous column have been processed in tally memory 605, the new items which belong to this column are retrieved from the item processor and dealt with as described above. To enable effective use to be made of tally memory 605, two counters 607 and 608 as well as an address selectopm block 606 have been added. During writing to tally memory 605, this memory is addressed with the aid of write-counter 608 via address selection block 606. At the start of the reading-in of the first column from item processor 500, write-counter 608 is reset to zero. The first item remainder fed to the tally memory 605 is thus written to address zero. Subsequently, the counter reading of write-counter 608 is increased by one so that the second item remainder from the first column is written to address one.

All item remainder from the first column are then written successively by ascending address into tally memory 605. The last item remainder is placed at address N. After that, an EOC bit which originates from the item processor is stored at address N+1.

When the second column is being processed, readcounter 607 and write-counter 608 are first reset to zero. The item remainders in the tally memory 605 are read out in conformity with the address indicated by counter 607. In other words, the item remainder at address zero is read out first. If a new item remainder has again been left over from this item remainder, such remainder will again be written to address zero, as indicated by writecounter 608.

The read-counter 607 is increased by one and the following item remainder is read out. The write-counter 608 is only increased if a remainder has again been left over from the item or item remainder which is being processed. In this way tally memory 605 is always filled from address zero onwards. The read-out of tally memory 605 continues until the EOC bit is read. After that, new items forming part of the columns being processed are retrieved from item processor 500, are processed, and any item remainders are successively stored in the tally memory 605 until an EOC bit is received again. Item-slice-processor control 609 consists of a Field Programmable Logic Array (FPLA) and a register, which together constitute a "state machine". The FPLA determines the new state the basis of the inforamtion supplied to the inputs and the state which is being processed. The information emerging at the output simultaneously determines the new state being processed.

The operation of the various blocks of the item-slice processor is controlled by the item-slice-processor 609. The control communication between the item-slice processor and the other parts of the decoder takes place via bus 612. The data-available signal 527 from the item processor and the data-request signal 615 from the pattern data generator are linked with item-slice-processor control 609, as are the data-request signal 526 and the data-available signal 616.

PATTERN DATA GENERATOR 700

The principal task of the pattern data generator is to translate the item-slice information supplied by item-slice-processor 600 into pixel patterns. The item-slice information comprises the data relating to the height of the item, the Y position on the page, the base address of the PPD memory at which the pixel information for the relevant item has been stored, and the item-progress. The item-progress is understood to mean the item remainder width-1 information. After being processed in the pattern data generator, the 16-bits words which represents the pixels in a slice are supplied, together with their relevant Y positions, to the column data generator 800 in response to its request.

Figure 5:
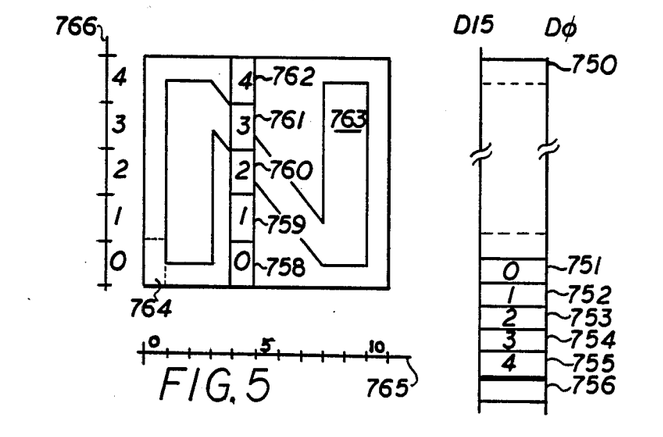
FIG. 5 represents the structure of a pixel pattern of an item.

FIG. 5 represents how the pixel patterns of an item are arranged in the PPD memory. The example used is a latter N (763), which has been divided into a matrix of 11×5 sectors. The item-progress has been plotted along horizontal axis 765, while the height minus 1 in words (=H) has been plotted along the vertical axis 766. The starting dot of the letter is sector 764. When defining the X and Y position of this item on the page, the position is related to this sector 764. The base address of this item is the address of memory location 750 where the pixel pattern of sector 764 is to be found.

An item-slice with 5 consecutive 16-bits words is indicated by the numbers 758 and 762 inclusive. The item-progress indicated on axis 765 is four for this slice. The item-slice word 758 is placed in the memory at location 751. The word 579 is at memory location 752 and word 762 is at memory location 755. The address of memory location 751 corresponds to the base address 750 plus the product of the height minus 1 of the item +1 (=H+1) and the item-progress. If base address 750 of the PPD memory were 1000 (hex$), then the address of word 758 and hence of memory location 751 in the PPD memory would be 1015 (hex$).

Figure 6:
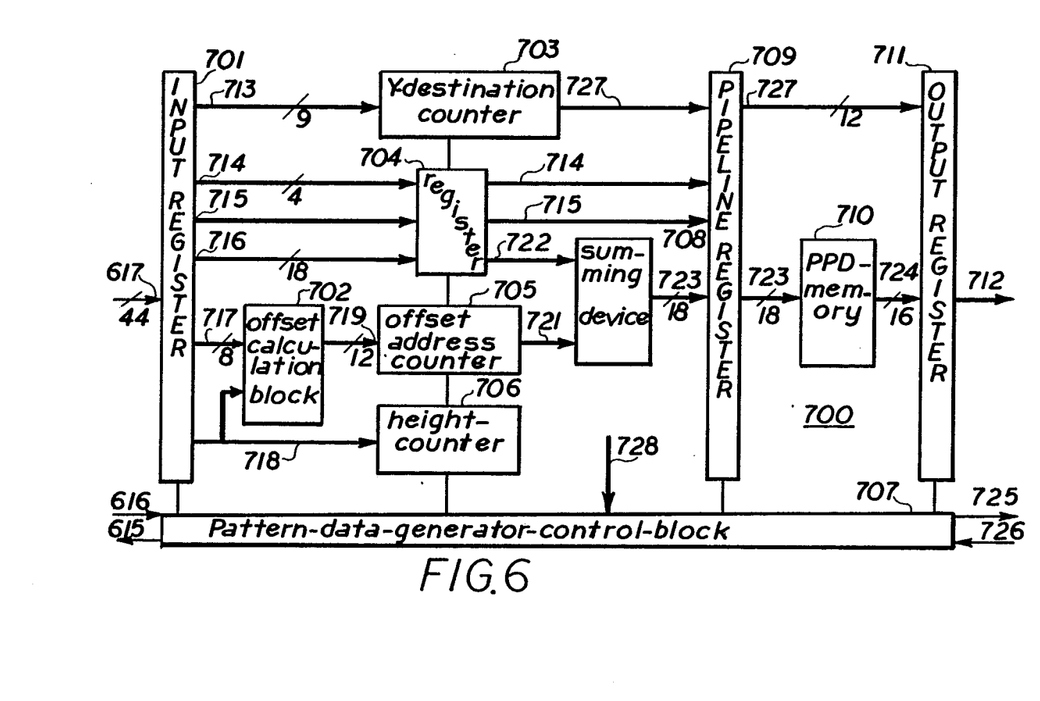
FIG. 6 is a block diagram of the pattern data generator of the decoder.

In FIG. 6 bus 617 is the connection between the output register 602 of item-slice processor 600 and input register 701 of pattern data generator 700. This 44-bits-wide bus 617 is divided up in such way that offset calculation block 702 receives the bit pattern forming part of the item-progress (lp) (8 bits) via bus 717 and the bit pattern forming part of the item height (H+1) (4 bits) via bus 718. In block 702 the product of the item-progress (lp) and the height (H+1) is calculated (lp×(H+1)). The offset signal thus calculated (12 bits) is sent through bus 719 to the offset address counter 705. In summing circuit 708 the offset address is added to the base address (18 bits), which is supplied via bus 716, register 704 and bus 722. Bus 733 is thus given the address of the first word of the relevant item-slice in the PPD memory 710.

Subsequently, the height of the item-slice being processed is counted down to zero in height-counter 706. For each subtraction step of height-counter 706 the contents of offset address counter 705 are increased by one and this increased value is in turn added to the base address in summing circuit 708. In this way the consecutive addresses which form part of a specific item-slice are selected in the PPD memory.

The 12-bits-wide information supplied through bus 617 relating to the Y position of an item on a page is divided up into the 8 most significant bist, which are fed via bus 713 to the Y-designation counter 703, and the 4 least significant bits, which are fed via bus 714 register 704. These four least significant bits of the Y position represent the shift information. Via bus 714 and pipeline register 709, this shift information is supplied via output register 711 to bus 712.

For each subtraction step of the height-counter 706, the contents of the Y-destination counter 703 are also increased by one. This new Y-position value is sent through bus 727 to output bus 712.

The pixel pattern which belongs to the address supplied on bus 733 is fed to the column data generator 800 via the output register 711 through bus 712.

The pattern-data-generator-control block 707 ensures the correct operation of the generator with the aid of control signals which are sent to the various counters and registers. Via bus 728 this control block 707 communicates with other control blocks in the decoder (clock signals, decode signal, etc.). A data-available line 725 and a data-request line 726 are provided between column data generator 800 and the pattern data generator 700.

COLUMN DATA GENERATOR 800

The task of the column data generator 800 (FIG. 7) is to convert the (parallel) information that has been supplied into a serial pixel bit flow for the laser printer. Via bus 712 the pipeline register 802 of the pattern data generator 700 receives the pixel bit pattern of the items (16-bits words) and also the relevant Y positions in respect of one specific X position. At this point the sequence is still arbitrary. These pixel bit patterns have to be sorted according to their ascending Y position, while pixel bit patterns with an identical Y position (overlays) have to be combined.

Figure 7:
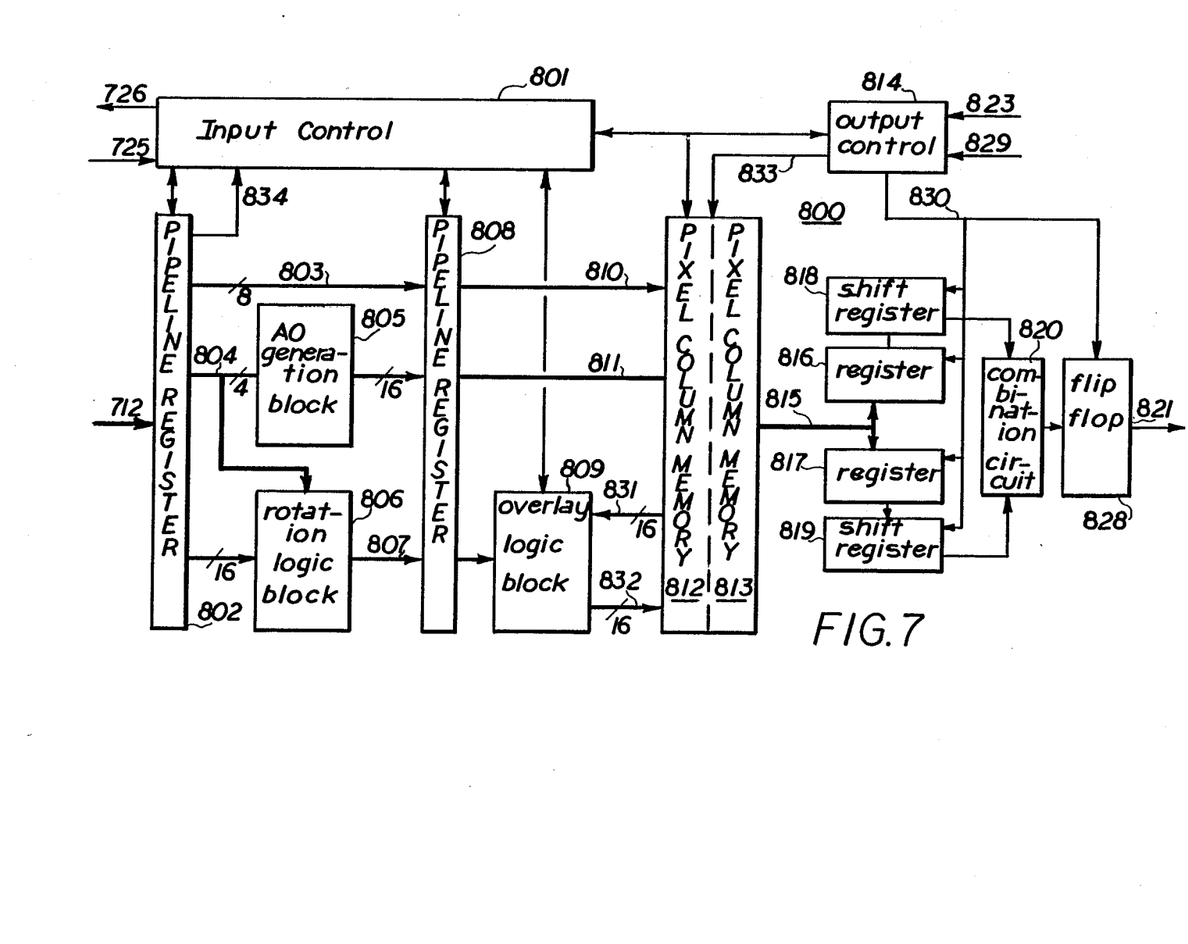
FIG. 7 is a block diagram of the column data generator of the decoder.

Since rapid signal processing is essential, the pixel column memories 812 and 813 are designed as separate 16-bits-wide and 512-words-deep memories. While one pixel column memory is being read out, the other pixel column memory is being filled with 16-bits words. To make it possible to address the 16-bits words in the pixel column, use is made of the 8 most significant bits of the Y position. So that it is still possible to indicate the position of an item on a page with an accuracy of 1 pixel while not having to abandon the simultaneous processing of 16-bits words, the four least significant bits, prior to their being stored in one of the pixel column memories 812 and 813, are used to ensure that the bits in the separate 16-bits words are displaced in such a way that the starting dot of an item (the word border) corresponds to the required Y position. This displacement is effected in a rotation logic block 806 with the aid of a barrel-shifter. The operation of this barrel-shifter 806 will be explained by reference to FIG. 8.

Figure 8:
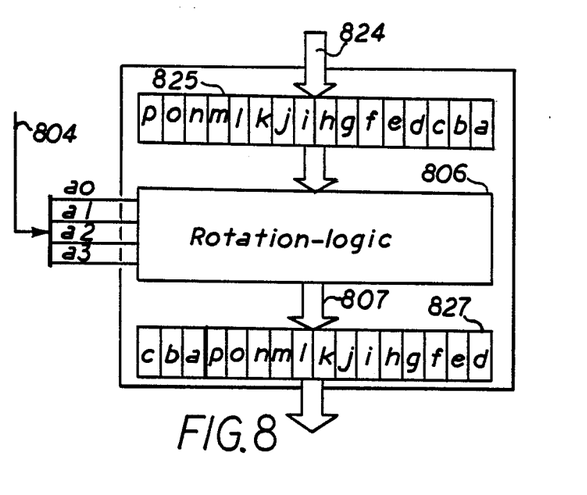
FIG. 8 is a block diagram of a barrel-shifter.

Through data-bus 824 the 16-bits words, which represent the pixel pattern of the item being processed, are fed from the PPD memory to input register 825 of barrel-shifter 806. Of the 12-bits information relating to the Y position of that pattern on the page, the 4 least significant bits are separated off and are also fed to barrel-shifter 806 via address bus 804. Depending on the address information on bus 804, the information which is present in input register 825 is shifted and stored in output register 827. Input register 825 and output register 827 form part of pipeline register 802 and pipeline register 808, respectively.

In input register 825 the letters a to p inclusive represent the contents of the register locations which are coupled to the respective data lines D0 and D15 inclusive. If it is assumed that at address bus 804 (via address lines A0 to A3) the least significant bits of the Y position correspond to, say, binary 3 (=0011), then the information from input register 825, shifted by three places, will be fed into the output register 827. The information that has been shifted out (a, b and c) will again be stored at the front in output register 827.

To enable high-speed processing, the barrel-shifter 806 is designed in such a way that shifting is effected in parallel, on all 16 bits at the same time.

Pixel column memories 812 and 813 are each composed of 16 memories of $512 \times 1$ bit which are used in parallel for writing-in of 16-bits words. These memories are addressed by using the 8 most significant bits of the Y position (the Y-word address), which are fed to the addresses A1–A8 of the 16 memories via pipeline register 802, bus 803 and pipeline register 808 through bus 810. The A0 address line of each memory IC is lined via bus 811 to A0 generation block 805.

The A0 generation block 805 has an input bus 804 through which the 4 least significant bits of the Y position are supplied. Depending on these input signals, one or more of the 16 outputs, each of which is linked to the A0 address of one memory IC of memory 812 or 813, may become a logical 1 or 0. For instance, if a signal supplied to the input corresponds to binary 3 (=0011), then three output lines which are linked to the A0 address lines of three memory ICs from pixel column memory 812 or 813 will become a logical 1, which means that these memories will be addressed at the next-higher word address compared to the other 13 memories. This makes it possible for the information shifted out in rotation logic block 806 (for example, bits a, b and c in FIG. 8) to be written to the next-higher word address in the pixel column memory 812 or 813. The overlay-logic block 809 comprises a register to which the data are supplied from the output register of barrel-shifter 806, which is situated in pipeline register 808. The pixel column memories 812 and 813 are addressed using the word address pertaining to those data, while the data already present at that address are also fed via bus 831 to overlay-logic block 809. The data is combined via an OR relation with the data resident in the overlay register, and the result of this is written back again to the selected address.

If one pixel column memory has been completely filled with the information from a scanning line, this memory is switched to the read-out state, while the other memory is changed from the read-out state into the wire-state. Output control 814 gives the command for this to the pixel column memories via bus 833. During the time that one memory is being filled, the other memory is read out.

Output bus 815 of pixel column memories 812 and 813 is linked to two registers 816 and 817, each of which is one word wide and each of which is connected through to a 16-bits shift register, 818 and 819, respectively. Output control 814 supplies the output addresses A0 to A8 inclusive to the pixel column memory 812 or 813 with the aid of a counter and via bus 833. During this read-out all A0 address lines of the 16 memory ICs are interlinked. The 16-bits data word at address location 1 of the pixel column memory is transmitted in parallel via bus 815 to register 817. Then, address location 1 is cleared (set to zero) and the address is increased by one, with the result that address location 2 is selected. The data at address location 2 are supplied to register 816 via output bus 815. Address location 2 is now cleared. In this same manner the shifted bits of a word, which had been stored at an even address location are supplied each time to shift register 818, while the non-shifted bits of the following word, which had been stored at an odd address location, are supplied to shift register 819.

The laser printer generates an internal burst signal which corresponds to the required write-frequency (the pixel-bit rate) of the pixel bit flow to be fed to the printer. This burst signal is transmitted via line 829 to output control 814 and is then distributed to shift registers 818 and 819 and to flip-flop 828. By means of this burst signal both the shift registers 818 and 819 are serially clocked out at the same time and the data from these registers are combined in combination circuit 820.

The output of combination circuit 820 is transmitted to flip-flop 828 and the burst signal ensures that the pixel bit flow to the laser printer via line 821 is synchronised when it leaves the column data generator 800 via line 821.

The control of the input logic of the column data generator is handled by input control 801. Data-request line 726 and data-available line 725 are also connected to input control 801. The EOC bit is also fed to input control 801 via line 834.

Although only one preferred embodiment of a decoder according to the invention has been described, it will be clear that modifications to this embodiment are also possible, which modifications will fall within the scope of the invention as specified in more detail in the claims set forth below.

What is claimed is:

1. In a decoder for converting information supplied in code about a compiled page into image information which is fed in the form of a serial pixel bit flow to a raster output scanner, in which the raster output scanner is designed to form with the aid of a number of scanning lines an image on an image-forming medium, comprising a first memory for the storage of all items occuring on the compiled page together with the m-bits information relating to their starting position on a scan line (y-position) of that page, the sorted table of items whereby the m-bits are composed of M least significant bits and (m−M) most significant bits, a second memory for the storage of the bit patterns of all items occurring in the first memory, the pixel pattern data table, a third memory for the storage of the address information relating to the bit patterns in the second memory and for the storage of format information for items, the table of pointers to pixel batter data, means for converting data taken from the sorted table of items, the pixel pattern data table and the table of pointers to pixel pattern data into n-bits words for each scanning line, at least one n-bits wide pixel column memory, a rotation logic circuit having means for shifting said n-bits words in a register as a function of the M least significant bits of the m-bits information about the position of the items on the page as stored in said first memory, whereby $2^M = n$; the improvement comprising circuit means for storing any information not shifted out of said register into said pixel column memory at an address location which is two times that of the (m−M) most significant bits of the said position information and for storing said information shifted out of said register at the next-higher address location; a buffer connected to the output of said pixel column memory; a first parallel-in-serial-out shift register for receiving through said buffer data from odd address locations of the pixel column memory; a second parallel-in-serial-out register for receiving through said buffer from the next-higher address locations of the pixel column memory in relation to the first shift register; a counter connected to the address starting points of the pixel column memory for generating successive addresses when that memory is being read out; and a combination circuit connected to the serial-out connections of the first and second shift registers for combining the output of said registers.

2. A decoder as claimed in claim 1 wherein the pixel column memory comprises n memory elements of which from each memory element one address line is connected to one of the m−M outputs of said circuit means and of which the remaining address lines are connected together.

3. A decoder as claimed in claims 1 or 2, wherein said circuit means comprises M inputs which are connected to the M least significant bits of the m-bits information relating to the position of the items on the page, and in response to the information on the inputs generates a bit pattern to the n-outputs which is used to address those memory elements from the pixel column memory which have to contain the shifted-out information at an address which is located one higher than the address location indicated by the (m−M) most significant bits of the Y position of the n-bits word which is being processed.

* * * * *